US012774772B2

(12) United States Patent
Qahtani et al.

(10) Patent No.: US 12,774,772 B2
(45) Date of Patent: Oct. 27, 2026

(54) CORROSION TREATMENT FOR PIPES

(71) Applicant: Saudi Arabian Oil Company, Dhahran (SA)

(72) Inventors: Ghazi Salman Qahtani, Al-Khobar (SA); Maher Hamed Alerwi, Dhahran (SA); Abdoulelah Naji Hannabi, Al Mubarraz (SA)

(73) Assignee: Saudi Arabian Oil Company, Dhahran (SA)

( * ) Notice: Subject to any disclaimer, the term of this patent is extended or adjusted under 35 U.S.C. 154(b) by 97 days.

(21) Appl. No.: 18/680,664

(22) Filed: May 31, 2024

(65) Prior Publication Data

US 2025/0369553 A1 Dec. 4, 2025

(51) Int. Cl.

| | |
|---|---|
| ***B08B 9/00*** | (2006.01) |
| ***F16L 55/38*** | (2006.01) |
| ***F16L 55/48*** | (2006.01) |
| ***F16L 58/02*** | (2006.01) |
| *E21B 41/02* | (2006.01) |

(52) U.S. Cl.

CPC ................ *F16L 58/02* (2013.01); *B08B 9/00* (2013.01); *F16L 55/38* (2013.01); *F16L 55/48* (2013.01); *E21B 41/02* (2013.01)

(58) Field of Classification Search

CPC . F16L 58/02; F16L 55/38; F16L 55/48; F16L 58/00; F16L 2101/12; B08B 9/00; E21B 41/02

See application file for complete search history.

(56) References Cited

U.S. PATENT DOCUMENTS

| | | | | |
|---|---|---|---|---|
| 3,690,348 A * | 9/1972 | Patterson | F16L 55/1283 15/104.061 |
| 10,816,142 B2 | 10/2020 | Aslam | |
| 2012/0067126 A1* | 3/2012 | Hartog | F16L 55/48 73/584 |
| 2021/0396135 A1 | 12/2021 | Knight et al. | |
| 2022/0120370 A1* | 4/2022 | Rajeh | F16L 55/1283 |

(Continued)

FOREIGN PATENT DOCUMENTS

| | | | |
|---|---|---|---|
| CN | 111207266 A * | 5/2020 | F16L 55/44 |
| RU | 2747601 | 5/2021 | |

OTHER PUBLICATIONS

Machine translation of CN-111207266-A (Year: 2020).*

(Continued)

*Primary Examiner* — Erin F Bergner

(74) *Attorney, Agent, or Firm* — Fish & Richardson P.C.

(57) ABSTRACT

A pipe treatment assembly includes a first capsule and a second capsule arranged to be deployed within a pipe that has a pipe fluid. The first capsule has a first housing that includes a first discharge port and a first treatment fluid or substance disposed within the first housing and exits the first housing through the first discharge port into the pipe fluid as the first capsule moves along the pipe to treat a first internal wall section of the pipe. The second capsule includes a second housing that includes a second discharge port. The second capsule is configured to discharge the second treatment fluid or substance through the second discharge port into the pipe fluid as the second capsule moves along the pipe to treat a second internal wall section of the pipe adjacent the first internal wall section of the pipe.

11 Claims, 4 Drawing Sheets

(56) References Cited

U.S. PATENT DOCUMENTS

2022/0250123 A1* 8/2022 Ahmari .................. E21B 37/02
2023/0102801 A1* 3/2023 Parrella ............ F16L 55/16455
138/98
2024/0077071 A1 3/2024 Mu et al.

OTHER PUBLICATIONS

Alamri, "Localized corrosion and mitigation approach of steel materials used in oil and gas pipelines—An overview," Engineering Failure Analysis, 2020, 116:104735, 17 pages.
Al-Janabi, "An overview of corrosion in oil and gas industry: upstream, midstream, and downstream sectors," Corrosion Inhibitors in the Oil and Gas Industry, 2020, 1-39, 38 pages.
Barker et al., "Internal corrosion of carbon steel pipelines for dense-phase CO2 transport in carbon capture and storage (CCS)—a review," International Materials Reviews, 2016, 62(1):1-31., 68 pages.
Döner et al., "Experimental and theoretical studies of thiazoles as corrosion inhibitors for mild steel in sulphuric acid solution," Corrosion Science, Sep. 2011, 53(9):2902-2913., 12 pages.
Nešić, "Key issues related to modelling of internal corrosion of oil and gas pipelines—A review," Corrosion Science, 2007, 49(12):4308-4338., 32 pages.
Popoola et al., "Corrosion problems during oil and gas production and its mitigation," International Journal of Industrial Chemistry, 2013, 4:1-15, 15 pages.
Rajeev et al., "Corrosion mitigation of the oil well steels using organic inhibitors—a review," Journal of Materials and Environmental Science, Jun. 2012, 3(5):856-869, 14 pages.

* cited by examiner

CORROSION TREATMENT FOR PIPES

TECHNICAL FIELD

This disclosure relates to corrosion treatment systems for pipes.

BACKGROUND

Corrosion and scaling are major concerns for oil and gas pipelines. Corrosion can compromise the integrity of pipelines and lead to leaks or failures. Wellbore production strings experience internal corrosion caused by extended exposure to oil, gas, water, additives, and other substances flowed in production strings. Improvements in the systems and methods for preventing and treating corrosion in pipelines are sought.

SUMMARY

Implementations of the present disclosure include a pipe treatment assembly that includes a first capsule and a second capsule. The first capsule is configured to be deployed within a pipe that has a pipe fluid. The first capsule has a first housing that includes a first discharge port and a first treatment fluid or substance. The first treatment fluid or substance is disposed within the first housing and is configured to exit the first housing through the first discharge port into the pipe fluid as the first capsule moves along the pipe to treat a first internal wall section of the pipe. The second capsule is configured to be deployed within the pipe and includes a second housing that includes a second discharge port. The second treatment fluid or substance is disposed within the second housing. The second capsule is configured to discharge the second treatment fluid or substance through the second discharge port into the pipe fluid as the second capsule moves along the pipe to treat a second internal wall section of the pipe adjacent the first internal wall section of the pipe.

In some implementations, the second capsule includes a valve coupled to the second discharge port and an actuator coupled to the second housing. The actuator opens the valve at a predetermined location of the second capsule within the pipe such that the second treatment fluid or substance treats the second internal wall section.

In some implementations, the second capsule further includes one or more sensors or instruments coupled to the second housing and a controller operationally coupled to the actuator. The controller controls, as a function of feedback received from the one or more sensors or instruments and as a function of location information of the first internal wall section, the actuator to open the valve at the predetermined location.

In some implementations, the one or more sensors or instruments include a speedometer that measures a speed of the second capsule. The controller controls, as a function of feedback from the speedometer, the actuator to open the valve a predetermined amount based on the speed of the second capsule to regulate a flow of the second treatment fluid or substance and fully treat the second internal wall section.

In some implementations, the controller determines, as a function of (i) the speed of the second capsule and (ii) a period of time during which the treatment fluid or substance is discharged, a length of the second internal wall section.

In some implementations, the one or more sensors or instruments include a global positioning system (GPS) device, and the controller is configured to control the actuator to open, as a function of (i) feedback received from the GPS device and (ii) location information of the first internal wall section, the valve at the predetermined location.

In some implementations, the second capsule further includes a GPS logger that records a location of a termination of the second internal wall section usable by a third capsule to determine a discharge location of a third treatment fluid or substance of the third capsule.

In some implementations, the second capsule includes a fluid sensor that senses an absence of the second treatment fluid or substance within the second capsule. The controller is configured to determine, as a function of feedback from the fluid sensor, a time period that it took the second treatment fluid or substance to be fully discharged.

In some implementations, the first and second treatment fluid or substance include at least one of a corrosion inhibitor, a chemical, or an additive.

In some implementations, the pipe includes a second pipe fluid immiscible with the pipe fluid. The second capsule further includes a buoyancy ring configured to keep the first capsule floating on an interface of the pipe fluid and the second pipe fluid.

In some implementations, the pipe fluid includes water and the second pipe fluid includes oil. The buoyancy ring includes a material with a density that is lower than water but greater than oil to maintain the second capsule floating on the interface of the water and oil, with the second discharge port facing the water such that the second treatment fluid or substance discharges into the water.

In some implementations, the second capsule further comprises a propeller odometer driven by a rotatable propeller configured to measure a travel distance of the second capsule as a function of rotations of the propeller.

In some implementations, the rotatable propeller is arranged to disturb a flow of the pipe fluid to facilitate a dissolution or mixing of the second treatment fluid or substance in the pipe fluid as the second fluid exits the second capsule.

Implementations of the present disclosure also include a method that includes deploying a first capsule within a pipe comprising a pipe fluid, the first capsule comprising a first treatment fluid or substance. The method also includes discharging the first treatment fluid or substance within the pipe into the pipe fluid to treat a first section of the pipe. The method also includes determining, as a function of at least one parameter of the first capsule, a location of a termination of the first section of the pipe. The method also includes deploying a second capsule within the pipe, the second capsule comprising a second treatment fluid or substance. The method also includes discharging, from the second capsule, the second treatment fluid or substance such that the second treatment fluid or substance treats a second section of the pipe adjacent the first section.

In some implementations, the second capsule comprises one or more sensors, a discharge port, a valve configured to regulate a rate of discharge of the second treatment fluid or substance through the discharge port, an actuator configured to operate the valve, and a controller configured to control the actuator. The discharging of the second treatment fluid or substance comprises controlling, by the controller and as a function of feedback from the one or more sensors, the actuator to open the valve and regulate a flow of the second treatment fluid or substance exiting the second capsule.

In some implementations, the location of the termination of the first section includes a location in which the first treatment fluid or substance completed treating the pipe. The controller controls the actuator to open the valve such that the second treatment fluid or substance begins treating the pipe at the location of the termination of the first section.

In some implementations, the one or more sensors comprise a global positioning system (GPS) device, a speedometer, and odometer. The controller determines, as a function of feedback from the speedometer, a speed of the second capsule along the pipe, and the discharging of the second treatment fluid or substance comprises controlling, by the controller and as a function of the speed of the second capsule, the actuator to open the valve a predetermined amount based on the speed of the second capsule to regulate the flow of the second treatment fluid or substance and fully treat the second section of the pipe.

In some implementations, the controller determines, as a function of (i) a speed of the second capsule and (ii) a period of time during which the valve is open, at least one of a velocity profile of the second capsule or a length of the second section of the pipe. The method further comprises deploying a third capsule and discharging, as a function of the length of the second section of the pipe, a third treatment fluid or substance to treat a third section of the pipe adjacent the second section of the pipe.

Implementations of the present disclosure include a pipe treatment system controller that includes one or more hardware processors and a computer storage medium communicatively coupled to the one or more hardware processors. The computer storage medium includes instructions that, when executed by the one or more hardware processors, cause the one or more hardware processors to perform operations that includes receiving, from first one or more sensors or instruments attached to a first capsule configured to be deployed within a pipe comprising a pipe fluid, first capsule information. The operations also include determining, as a function of the first capsule information, a location of a first treatment area. The first treatment area includes an area of the pipe treated by a first treatment fluid or substance discharged from the first capsule. The operations also include transmitting, to a controller and as a function of the location of the first treatment area, instructions to cause the controller to control an actuator of a valve of a second capsule such that the valve opens while the second capsule is moving on the pipe fluid along the pipe to discharge a second treatment fluid or substance of the second capsule, treating a second treatment area downstream of and adjacent the first treatment area.

In some implementations, the second capsule includes a second one or more sensors or instruments, and the transmitting includes transmitting the instructions as a function of (i) the location of the first treatment area and (ii) sensor feedback received from the second one or more sensors or instruments.

Particular implementations of the subject matter described in this specification can be implemented so as to realize one or more of the following advantages. For example, the pipeline treatment assembly of the present disclosure allows for predetermined pipe sections or entire pipes to be selectively treated with corrosion inhibitors. Also, the pipeline treatment assembly of the present disclosure can be quickly installed in existing wells without significant retrofitting, which can save time and resources. Moreover, the pipeline treatment assembly of the present disclosure can be used as a backup corrosion inhibitor (CI) system in cases where traditional CI systems are offline or otherwise unavailable.

DETAILED DESCRIPTION OF THE DISCLOSURE

Corrosion inhibitors (CI) can protect the internal integrity of a pipe (e.g., a wellbore production string). Some CI systems release large quantities or CI from large storage tanks to treat the pipelines. Such systems can lack the even distributions and systematic regulations required along the path of the pipeline. This can lead to uneven treated areas of the pipe, with some areas receiving more treatment that others. The pipe treatment assembly of the present disclosure can help address such concerns by allowing the even distribution and release of corrosion inhibitors and chemicals at a controlled discharge rate as the capsules change in flow velocity.

Figure 1:
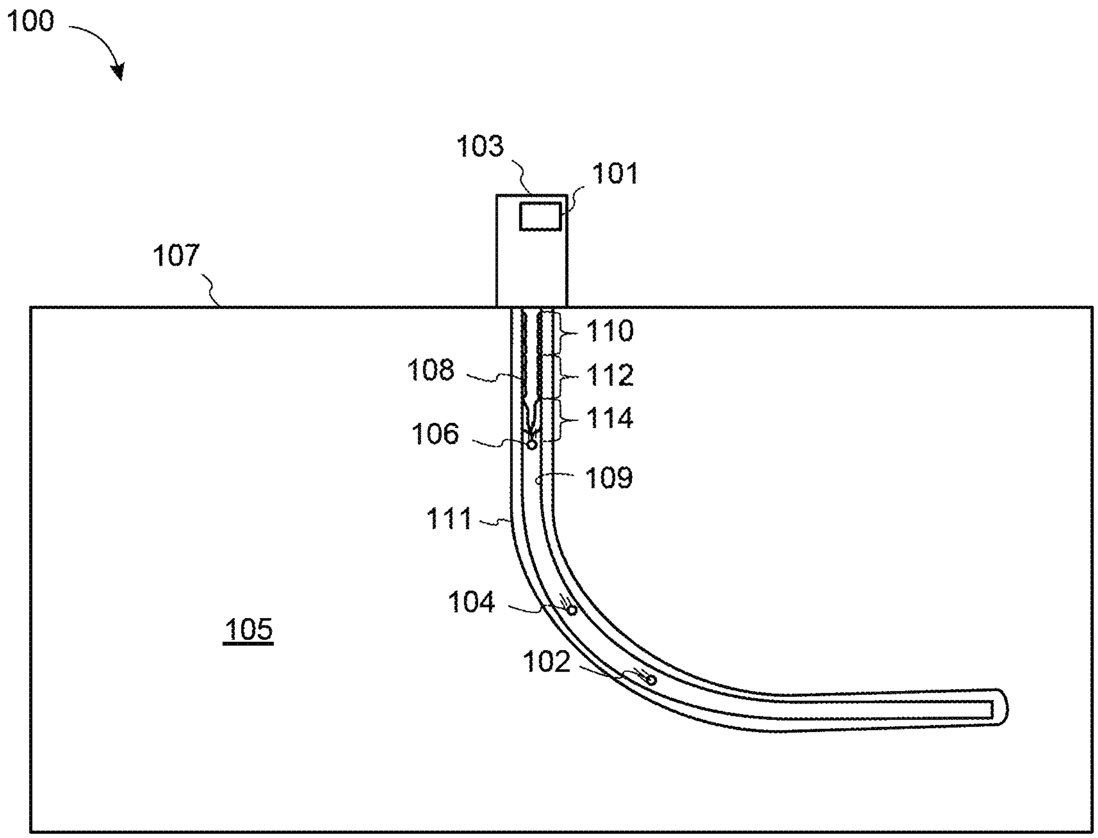
FIG. 1 shows a front schematic view, partially cross-sectional, of an example pipeline treatment assembly implemented in a production wellbore.

FIG. 1 shows a pipe treatment assembly 100 that includes multiple capsules 102, 104, 106 (e.g., balls), a surface controller 101 (e.g., a computer, a processor, a controller, etc.), and a feeding assembly 103 (e.g., a dosing injector, or dosing injector line). The treatment assembly is used to evenly treat a pipe 108 such as a wellbore string (e.g., a production string or a casing) disposed within a wellbore 111. The wellbore 111 extends from a terranean surface 107 into a subterranean formation 105 to extract production fluid such as hydrocarbons.

The capsules 102, 104, 106 can be shaped as balls, oval-like capsules, tubular cylinders, etc. The capsules 102, 104, 106 can be made of a rigid material such as metal, a composite, or hard plastic. The capsules 102, 104, 106 can be delivered manually or automatically into the pipe 108.

The first capsule 102 treats a first area 110 or section of the wellbore 111, the second capsule 104 treats a second area 112 that starts at the end of the first area 110, and the third capsule 106 treats a third area 114 that starts at the end of the second area 112. Multiple capsules can be deployed to treat the entire pipe 108, one section at a time. The pipe treatment assembly 100 can also be used to treat other pipes such as downstream pipes, (e.g., hydrocarbon processing pipes), drill pipes, etc. In some aspects, the assembly 100 includes only one capsule to selectively treat a single area of the pipe 108. In some aspects, the assembly 100 includes several capsules to evenly treat the entire length of the pipe 108.

In some aspects, the feeding assembly 103 is part of the wellhead. The feeding assembly 103 feeds or deploys balls into the pipe 108 at predetermined time intervals to sequentially treat the pipe 108. In some aspects, the surface controller 101 is part of and controls the feeding assembly 103 to automatically program and deploy the capsules. The processing device receives information (e.g., location information) from the capsules 102, 104, 106 and can use that information to at least one of: (i) time the release of the subsequent capsule, (ii) transmit information from the previous capsule to the subsequent capsule, or (iii) program the controller of the subsequent capsule. The surface controller 101 can be attached to the wellhead or can be at a remote location away from the wellhead.

The capsules are deployed and opened at intervals to sequentially treat the internal wall 109 of the pipe 108. For example, the first capsule 102 treats a first internal wall section 110 of the pipe 108, the second capsule 104 treats a second internal wall section 112 of the pipe 108, and the third capsule 106 treats a third internal wall section 114 of the pipe 108. The second internal wall section 112 is downstream of and adjacent the first internal wall section 110. The third internal wall section 114 is downstream of and adjacent the second internal wall section 112. The capsules can treat the vertical and non-vertical sections of the pipe 108.

Figure 2:
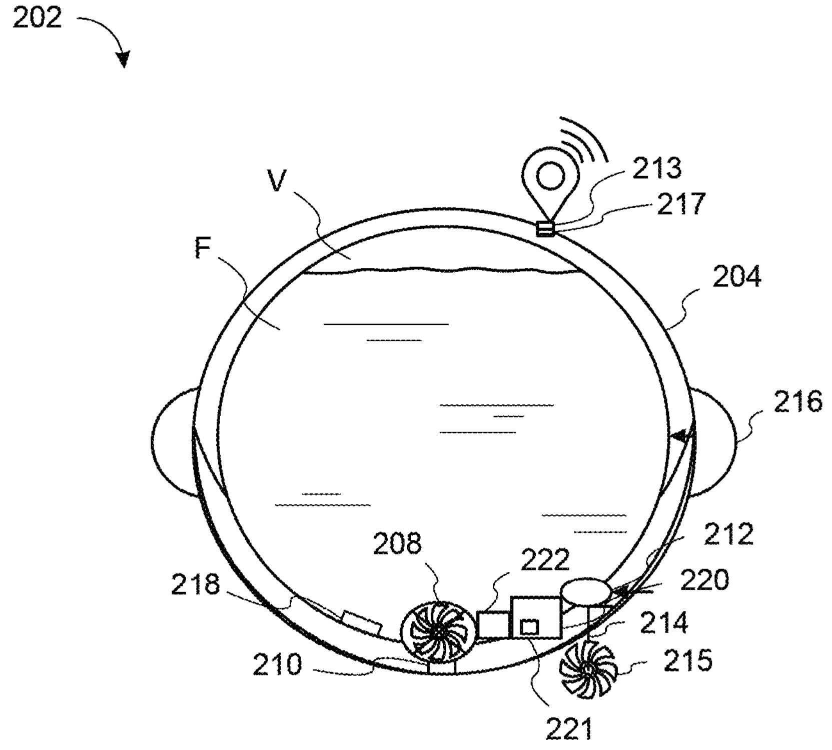
FIG. 2 shows a side schematic view, partially cross-sectional, of an example capsule of a pipeline treatment assembly.

FIG. 2 shows an example capsule 202. The capsule 202 is sized to fit within and flow along the pipe 108 (see FIG. 1). The capsule 202 has a housing 204 defining an inner volume "V" that contains a treatment fluid or substance "F" (e.g., a corrosion inhibitor, a chemical, or an additive). The housing 204 defines a discharge port 210 through which the treatment fluid "F" exits the capsule to treat the internal walls of the pipe 108. The capsule 202 has a valve 208 at the discharge port 210 that regulates the flow of the treatment fluid "F" exiting the pipe 108.

The capsule 202 also includes multiple sensors or instruments 212, 214, 213, 218, a controller 220, an actuator 222, and a buoyance ring 224. In some aspects, the sensors or instruments include a speedometer 212, an odometer 214, a global positioning system (GPS) device 213, and a fluid level sensor 218. The controller 220 is electrically coupled to the sensors or instruments 212, 214, 213, 218, and controls, as a function of feedback or information received from at least one of the sensors or instruments 212, 214, 213, 218, the actuator. The actuator in turn operates the valve to controllably release the treatment fluid "F" as a function of the location and speed of the capsule 202.

For example, the controller 220 receives, from the speedometer 212, speed information of the capsule 202. The controller 220 also receives, from the odometer 214, travel distance information of the capsule 202. The controller also receives, from the GPS device 213, location information of the capsule 202. The controller also receives, from the fluid level sensor 218, fluid level information of the fluid "F" within the capsule 202.

The controller 220 controls, as a function of at least one of the speed information, travel distance information, location information, or fluid level information, the valve 208. The controller 220 can use all or some of the information received from the sensors or instruments, and make decisions based on such information to release the treatment fluid "F" at the right time, location, and discharge flow rate to evenly and selectively treat a portion of the pipe 108.

Moreover, the controller 220 can have data and instructions stored in a computer storage medium 221 that includes a discharge location i.e., a location along the pipe where the controller 220 should open the valve 208. The discharge location can be the location where the previously deployed capsule terminated its treatment. The controller 220 can receive the data and instructions directly from another capsule, or from the surface controller 101 of the capsule feeding assembly 103 (see FIG. 1). For example, each capsule can wirelessly communicate, in real-time, its GPS location to each capsule and/or to the surface controller 101. Such location can include the location where the valve opened (e.g., the beginning location or time of its treatment area) and its location where its treatment fluid was fully discharged (e.g., the termination location or time of its treatment area).

For example, the controller 220 controls the actuator 222 as a function of (i) feedback received from the speedometer 212, odometer 214, and GPS device 213, and (ii) the location (e.g., depth along the wellbore, GPS location, etc.) of the area treated by the previously-deployed capsule. Specifically, the controller 220 can use the information received from the speedometer 212, odometer 214, and GPS device 213 to determine the real-time speed and location of the capsule 202 to open the valve 208 right when the capsule 202 reaches the end of the area (e.g., section 110 in FIG. 1) treated by the previously deployed capsule. In some aspects, the controller 220 can determine parameter of the capsule 202 indirectly as a function of feedback from one or more sensors. For example, the controller 220 can determine the speed of the capsule 202 without the speedometer, by dividing the travelling distance by the travelling time.

In some aspects, the odometer 214 includes a propeller 215 (e.g., rotor blades, a water wheel, etc.) and the odometer uses the number of propeller revolutions of the propeller 215 to determine the distance traveled by the capsule 202. The speedometer 212 measures the speed of the capsule 202. In some aspects, the speedometer 212 is connected to the propeller odometer 214 to measure the speed of the capsule 202 as a function of the speed of the propeller revolutions. Also, the odometer propeller 215 can disturb the flow of the pipe fluid in front of the flow discharge 210 to help the treatment fluid "F" dissolved in the pipe fluid. The odometer 214 can be electronic (e.g., use magnetic or optical sensors that track pulses of the propeller 215) or mechanical (e.g., use gears to count the rotations of the propeller 215). Similarly, the speedometer 212 can be electronic or mechanical.

In some aspects, the controller 220 controls the flow of discharge as a function of the speed of the capsule 202. For example, the controller 220 controls, as a function of feedback from the speedometer 212, the actuator 222 to open the valve 208 a predetermined amount based on the speed of the capsule 202 to regulate the flow of the treatment fluid "F" and evenly treat the pipe. Specifically, the faster the capsule 202 travels, the more the valve 208 opens to increase the discharge flow. Conversely, the slower the capsule 202 flows, the less the valve 208 opens to decrease the discharge flow.

Additionally, the controller 220 controls, as a function of the odometer 214 and/or the GPS device 213, when the valve 208 opens. For example, the controller 220 compares the distance information received from the odometer 214 to a distance of the area treated by the previously deployed capsule. If the area treated by the previously deployed capsule ends, for example, at a depth of 300 feet, the controller 220 opens the valve 208 when the capsule 202 reaches a depth of 300 feet (or when the capsule 202 is at a predetermined distance from the 300 feet). The controller 220 can also use the GPS location received from the GPS device 213 to determine the location of the capsule 202 or to more accurately determine, by combining the GPS data with the odometer data, the location of the capsule 202.

The controller 220 uses the feedback from the fluid level sensor 218 to determine the length of the treated area. For example, the fluid level sensor 218 is located near the discharge port 210 or somewhere along the internal wall of the capsule 202 to detect when the treatment fluid "F" is depleted or at a certain level, indicating that all or most of the treatment fluid "F" has been discharged from the capsule 202. The controller 220 uses the feedback from the fluid level sensor 218 to the time period from when the valve 208 was opened to the time the fluid was discharged. The controller can use such time period and the location information to determine where the treated area is and how long treated area is.

In some aspects, the computer storage medium 221 stores the speed information, travel distance information, location information, and fluid level information. From such information, the controller 220 or surface computer can determine a velocity profile of the capsule 202, and location history of the capsule 202, a location of the treated area, etc. In some aspects, the GPS device 213 has its own storage device 217 (e.g., a GPS logger) to store the location history of the capsule 202. The GPS storage device 217 can record the location of the termination of the treated section, and the following capsule can use such information to determine a discharge location of such capsule when it is deployed.

In some aspects, the controller 220 can be implemented as a computer system or a distributed computer system (e.g., disposed partly at the surface and partly within the capsules). The computer system can include one or more processors and a computer-readable medium storing instructions executable by the one or more processors to perform the operations described here. In some implementations, the controller 220 can be implemented as processing circuitry, firmware, software, or combinations of them.

Figure 3:
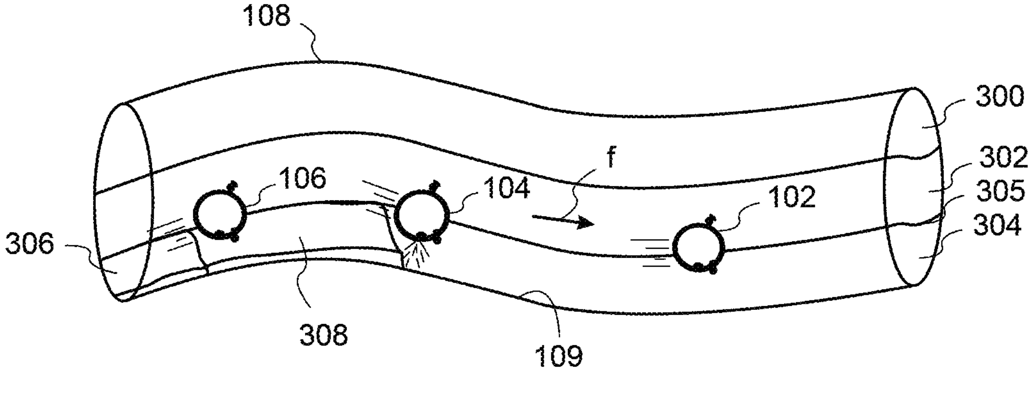
FIG. 3 shows a side perspective schematic view a section of a pipe treated with multiple capsules.

Referring also to FIG. 3, the pipe 108 has a pipe fluid "f" that can include a water layer 304 and an oil layer 302 (or condensate gas or another fluid immiscible), with an water-oil interface 305 therebetween. The pipe can also have an empty space 300 (or gas layer), above the water and oil layers. The buoyance ring 216 can maintain, in a non-vertical section of the pipe 108, the capsule 202 on a surface of a water layer 304. For example, the buoyance ring 216 floats and maintains the capsule 202 in the oil-water interface 305, with the discharge port 210 facing down or otherwise facing the water layer 304. In some aspects, the buoyancy ring 216 allows the capsule 202 to travel along the water in a more controlled and predictable manner, as compared to a capsule without the buoyancy ring 216.

In some aspects, the buoyancy ring 216 is made of foam, rubber, or a different material with a density that is lower than water but greater than oil to maintain the capsule floating on the water-oil interface 305. The buoyancy ring 216 can be part of the housing 204 and reside at the center of the housing 204, with its center at the center of the ball-shaped capsule 202. In some aspects, instead of a buoyancy ring, the capsule 202 has a shell, half sphere, or other type of floater made of a material that floats on water. As shown in FIG. 2 it is in blue color. The material of the ring is any material that can be floated on water and drawn in oil (i.e. float on the oil/water interface)

The treatment fluid "F" of each pipe is discharged sequentially as the capsules move along the pipe fluids 304, 302 to treat respective sections of the internal wall 109 of the pipe 108. For example, a first treatment layer 306 is first disposed by the first capsule 102. The first treatment layer 306 spans a first treatment section of the pipe (see FIG. 1). The first treatment layer 306 can extend radially along the entire bore of the pipe or can cover just the area touched by the pipe fluid (or the water). Then, the second capsule 104 disposes a second treatment layer 308 that follows the first treatment layer 306. Once the second treatment layer 308 ends, the third capsule 106 begins discharging its treatment fluid to form a third treatment layer that follows the second treatment layer 308.

The capsules can be deployed in sequential order. For example, when the first capsule 102 discharges the quantity of corrosion inhibitor, the first capsule 102 marks the location where it has fully discharged its corrosion inhibitor. Then, the first capsule 102 sends the location coordination to the second ball 104 (or to the surface feeding assembly 103) so that the second ball 104 can know when to start discharging from that location and forward. In other words, each capsules determines the location where their corrosion inhibitor will be discharged either before the capsule is deployed, or while the capsule is flowed downhole to the location to be treated.

Figure 4:
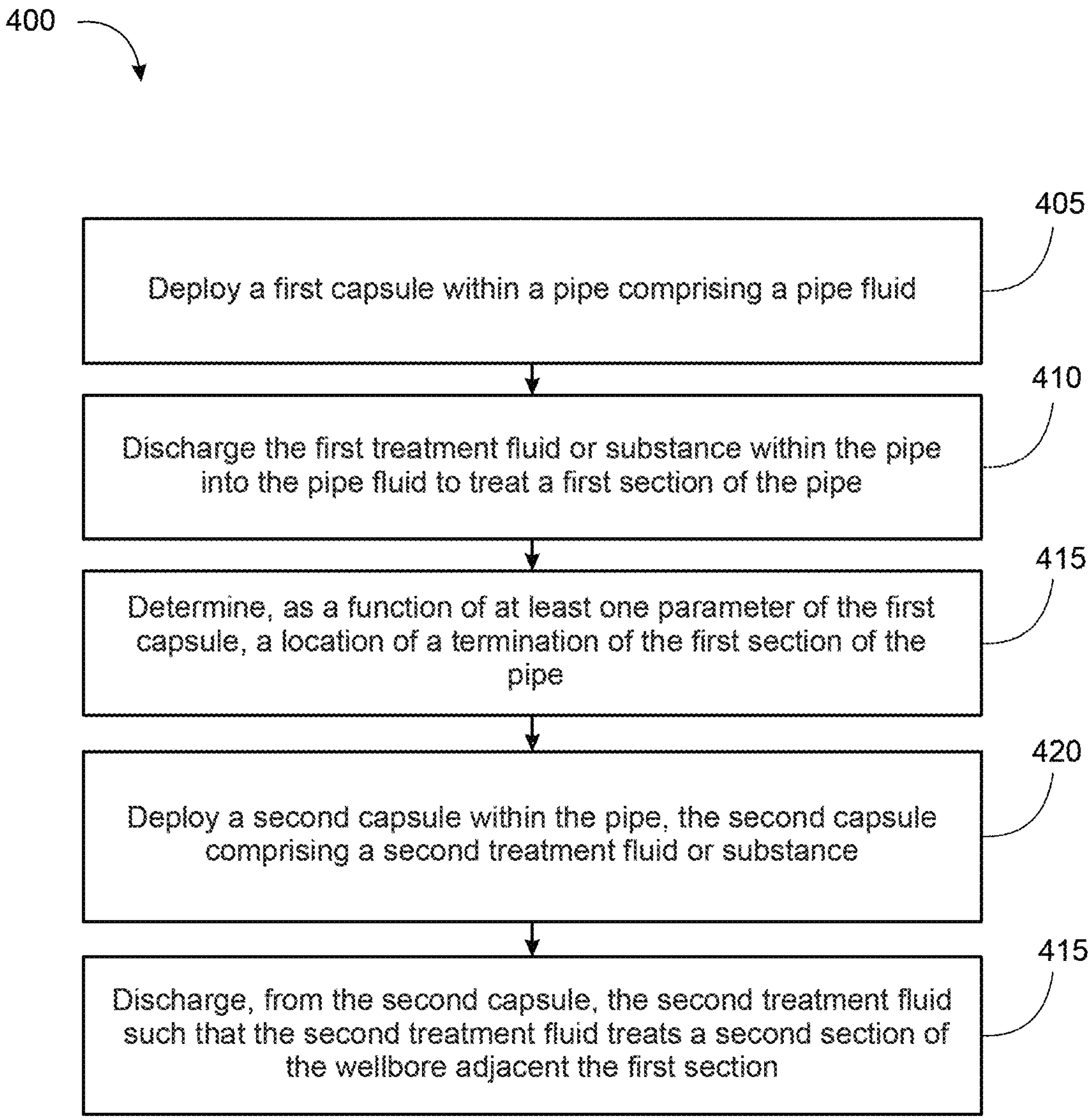
FIG. 4 show a flow chart of an example method of treating a pipeline.

FIG. 4 shows a flow chart of a pipeline treatment method (400). The method includes deploying a first capsule within a pipe comprising a pipe fluid, the first capsule comprising a first treatment fluid or substance (405). The method also includes discharging the first treatment fluid or substance within the pipe into the pipe fluid to treat a first section of the pipe (410). The method also includes determining, as a function of at least one parameter of the first capsule, a location of a termination of the first section of the pipe (415). The method also includes deploying a second capsule within the pipe, the second capsule comprising a second treatment fluid or substance (420). The method also includes discharging, from the second capsule, the second treatment fluid or substance such that the second treatment fluid or substance treats a second section of the wellbore adjacent the first section (425).

Figure 5:
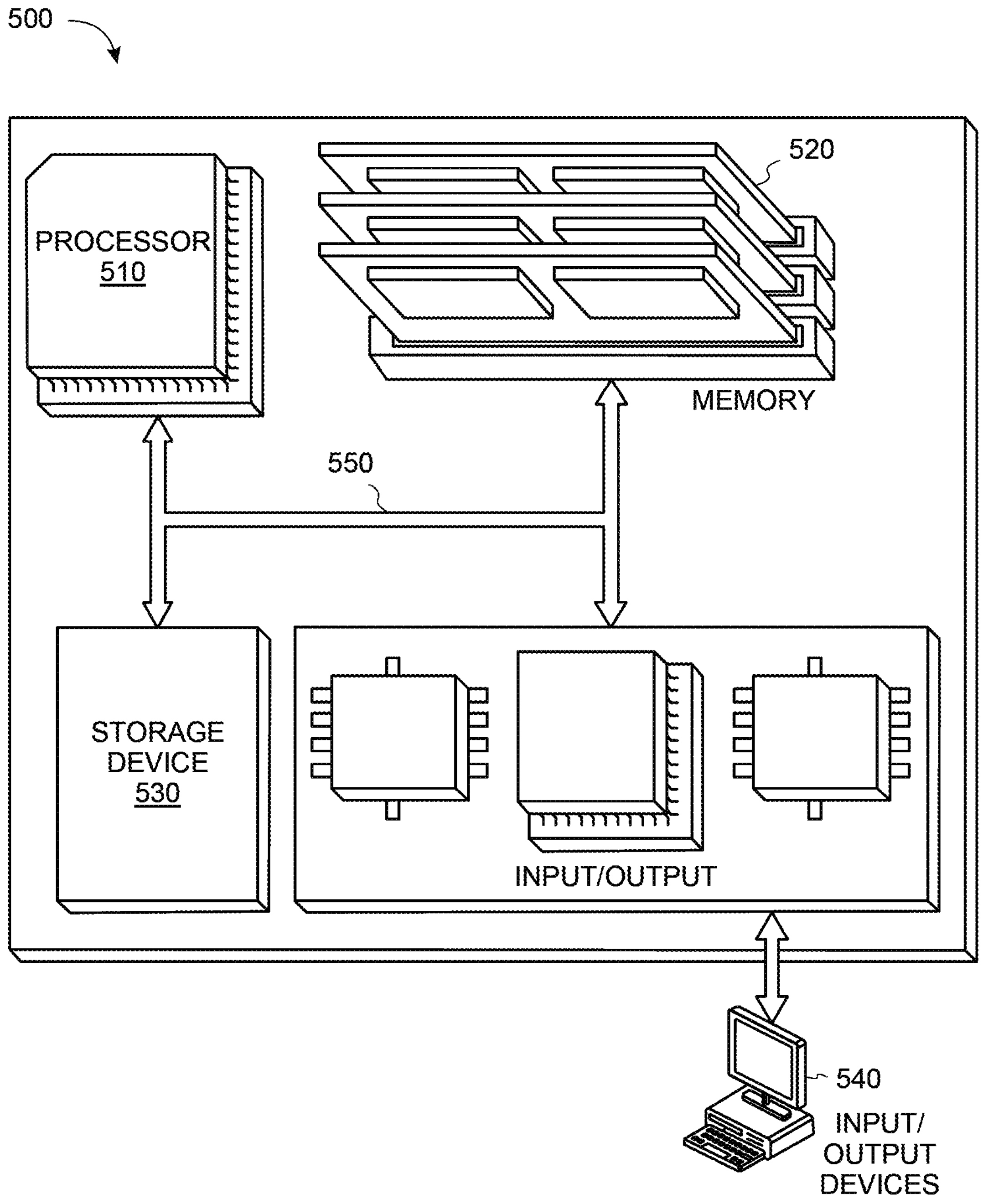
FIG. 5 shows a schematic illustration of an example control system or controller for a pipeline treatment assembly according to the present disclosure.

FIG. 5 is a schematic illustration of an example control system or controller for a pipe treatment assembly according to the present disclosure. For example, the controller 500 may include or be part of the controller 101 shown in FIG. 1 or the capsule controller 220 shown in FIG. 2. The controller 500 is intended to include various forms of digital computers, such as printed circuit boards (PCB), processors, digital circuitry, or otherwise. Additionally, the system can include portable storage media such as Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 500 includes a processor 510, a memory 520, a storage device 530, and an input/output device 540. Each of the components 510, 520, 530, and 540 are interconnected using a system bus 550. The processor 510 is capable of processing instructions for execution within the controller 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the controller 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the controller 500. In one implementation, the storage device 530 is a computer-readable medium. In various different implementations, the storage device 530 may be a floppy disk device, a hard disk device, an optical disk device, or a tape device.

The input/output device 540 provides input/output operations for the controller 500. In one implementation, the input/output device 540 includes a keyboard and/or pointing device. In another implementation, the input/output device 540 includes a display unit for displaying graphical user interfaces.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

Examples

In an example implementation, a pipe treatment assembly that includes a first capsule and a second capsule. The first capsule is configured to be deployed within a pipe that has a pipe fluid. The first capsule has a first housing that includes a first discharge port and a first treatment fluid or substance. The first treatment fluid or substance is disposed within the first housing and is configured to exit the first housing through the first discharge port into the pipe fluid as the first capsule moves along the pipe to treat a first internal wall section of the pipe. The second capsule is configured to be deployed within the pipe and includes a second housing that includes a second discharge port. The second treatment fluid or substance is disposed within the second housing. The second capsule is configured to discharge the second treatment fluid or substance through the second discharge port into the pipe fluid as the second capsule moves along the pipe to treat a second internal wall section of the pipe adjacent the first internal wall section of the pipe.

In an example implementation combinable with any other example implementation, the second capsule includes a valve coupled to the second discharge port and an actuator coupled to the second housing. The actuator opens the valve at a predetermined location of the second capsule within the pipe such that the second treatment fluid or substance treats the second internal wall section.

In an example implementation combinable with any other example implementation, the second capsule further includes one or more sensors or instruments coupled to the second housing and a controller operationally coupled to the actuator. The controller controls, as a function of feedback received from the one or more sensors or instruments and as a function of location information of the first internal wall section, the actuator to open the valve at the predetermined location.

In an example implementation combinable with any other example implementation, the one or more sensors or instruments include a speedometer that measures a speed of the second capsule. The controller controls, as a function of feedback from the speedometer, the actuator to open the valve a predetermined amount based on the speed of the second capsule to regulate a flow of the second treatment fluid or substance and fully treat the second internal wall section.

In an example implementation combinable with any other example implementation, the controller determines, as a function of (i) the speed of the second capsule and (ii) a period of time during which the treatment fluid or substance is discharged, a length of the second internal wall section.

In an example implementation combinable with any other example implementation, the one or more sensors or instruments include a global positioning system (GPS) device, and the controller is configured to control the actuator to open, as a function of (i) feedback received from the GPS device and (ii) location information of the first internal wall section, the valve at the predetermined location.

In an example implementation combinable with any other example implementation, the second capsule further includes a GPS logger that records a location of a termination of the second internal wall section usable by a third capsule to determine a discharge location of a third treatment fluid or substance of the third capsule.

In an example implementation combinable with any other example implementation, the second capsule includes a fluid sensor that senses an absence of the second treatment fluid or substance within the second capsule. The controller is configured to determine, as a function of feedback from the fluid sensor, a time period that it took the second treatment fluid or substance to be fully discharged.

In an example implementation combinable with any other example implementation, the first and second treatment fluid or substance include at least one of a corrosion inhibitor, a chemical, or an additive.

In an example implementation combinable with any other example implementation, the pipe includes a second pipe fluid immiscible with the pipe fluid. The second capsule further includes a buoyancy ring configured to keep the first capsule floating on an interface of the pipe fluid and the second pipe fluid.

In an example implementation combinable with any other example implementation, the pipe fluid includes water and the second pipe fluid includes oil. The buoyancy ring includes a material with a density that is lower than water but greater than oil to maintain the second capsule floating on the interface of the water and oil, with the second discharge port facing the water such that the second treatment fluid or substance discharges into the water.

In an example implementation combinable with any other example implementation, the second capsule further comprises a propeller odometer driven by a rotatable propeller configured to measure a travel distance of the second capsule as a function of rotations of the propeller.

In an example implementation combinable with any other example implementation, the rotatable propeller is arranged to disturb a flow of the pipe fluid to facilitate a dissolution or mixing of the second treatment fluid or substance in the pipe fluid as the second fluid exits the second capsule.

In an example implementation, a method that includes deploying a first capsule within a pipe comprising a pipe fluid, the first capsule comprising a first treatment fluid or substance. The method also includes discharging the first treatment fluid or substance within the pipe into the pipe fluid to treat a first section of the pipe. The method also includes determining, as a function of at least one parameter of the first capsule, a location of a termination of the first section of the pipe. The method also includes deploying a second capsule within the pipe, the second capsule comprising a second treatment fluid or substance. The method also includes discharging, from the second capsule, the second treatment fluid or substance such that the second treatment fluid or substance treats a second section of the pipe adjacent the first section.

In an example implementation combinable with any other example implementation, the second capsule comprises one or more sensors, a discharge port, a valve configured to regulate a rate of discharge of the second treatment fluid or substance through the discharge port, an actuator configured to operate the valve, and a controller configured to control the actuator. The discharging of the second treatment fluid or substance comprises controlling, by the controller and as a function of feedback from the one or more sensors, the actuator to open the valve and regulate a flow of the second treatment fluid or substance exiting the second capsule.

In an example implementation combinable with any other example implementation, the location of the termination of the first section includes a location in which the first treatment fluid or substance completed treating the pipe. The controller controls the actuator to open the valve such that the second treatment fluid or substance begins treating the pipe at the location of the termination of the first section.

In an example implementation combinable with any other example implementation, the one or more sensors comprise a global positioning system (GPS) device, a speedometer, and odometer. The controller determines, as a function of feedback from the speedometer, a speed of the second capsule along the pipe, and the discharging of the second treatment fluid or substance comprises controlling, by the controller and as a function of the speed of the second capsule, the actuator to open the valve a predetermined amount based on the speed of the second capsule to regulate the flow of the second treatment fluid or substance and fully treat the second section of the pipe.

In an example implementation combinable with any other example implementation, the controller determines, as a function of (i) a speed of the second capsule and (ii) a period of time during which the valve is open, at least one of a velocity profile of the second capsule or a length of the second section of the pipe. The method further comprises deploying a third capsule and discharging, as a function of the length of the second section of the pipe, a third treatment fluid or substance to treat a third section of the pipe adjacent the second section of the pipe.

In an example implementation, a pipe treatment system controller that includes one or more hardware processors and a computer storage medium communicatively coupled to the one or more hardware processors. The computer storage medium includes instructions that, when executed by the one or more hardware processors, cause the one or more hardware processors to perform operations that includes receiving, from first one or more sensors or instruments attached to a first capsule configured to be deployed within a pipe comprising a pipe fluid, first capsule information. The operations also include determining, as a function of the first capsule information, a location of a first treatment area. The first treatment area includes an area of the pipe treated by a first treatment fluid or substance discharged from the first capsule. The operations also include transmitting, to a controller and as a function of the location of the first treatment area, instructions to cause the controller to control an actuator of a valve of a second capsule such that the valve opens while the second capsule is moving on the pipe fluid along the pipe to discharge a second treatment fluid or substance of the second capsule, treating a second treatment area downstream of and adjacent the first treatment area.

In an example implementation combinable with any other example implementation, the second capsule includes a second one or more sensors or instruments, and the transmitting includes transmitting the instructions as a function of (i) the location of the first treatment area and (ii) sensor feedback received from the second one or more sensors or instruments.

What is claimed is:

1. A pipe treatment assembly, comprising:

a first capsule configured to be deployed within a pipe comprising a pipe fluid, the first capsule comprising:
 a first housing comprising a first discharge port, and
 a first treatment fluid or substance disposed within the first housing and configured to exit the first housing through the first discharge port into the pipe fluid as the first capsule moves along the pipe to treat a first internal wall section of the pipe; and a second capsule configured to be deployed within the pipe, the second capsule comprising:
 a second housing comprising a second discharge port,
 a second treatment fluid or substance disposed within the second housing, the second capsule configured to discharge the second treatment fluid or substance through the second discharge port into the pipe fluid as the second capsule moves along the pipe to treat a second internal wall section of the pipe downstream of and adjacent the first internal wall section of the pipe,
 a valve coupled to the second discharge port,
 an actuator coupled to the second housing, the actuator configured to open the valve at a predetermined location of the second capsule within the pipe such that the second treatment fluid or substance treats the second internal wall section
 one or more sensors or instruments coupled to the second housing, and
 a controller operationally coupled to the actuator, the controller configured to control, as a function of feedback received from the one or more sensors or instruments and as a function of location information of the first internal wall section, the actuator to open the valve at the predetermined location.

2. The pipe treatment assembly of claim 1, wherein the one or more sensors or instruments comprise a speedometer configured to measure a speed of the second capsule, the controller configured to control, as a function of feedback from the speedometer, the actuator to open the valve a predetermined amount based on the speed of the second capsule to regulate a flow of the second treatment fluid or substance and fully treat the second internal wall section.

3. The pipe treatment assembly of claim 2, further comprising a third capsule, wherein the controller is configured to determine, as a function of (i) the speed of the second capsule and (ii) a period of time during which the second treatment fluid or substance is discharged, a length of the second internal wall section, and the controller is configured to transmit the length of the second internal wall section to the third capsule configured to treat, as a function of the length of the second internal wall section, the pipe at a third internal wall section downstream of and adjacent the second internal wall section.

4. The pipe treatment assembly of claim 1, wherein the one or more sensors or instruments comprise a global positioning system (GPS) device, and the controller is configured to control the actuator to open, as a function of (i) feedback received from the GPS device and (ii) location information of the first internal wall section, the valve at the predetermined location.

5. The pipe treatment assembly of claim 2, further comprising a third capsule, wherein the second capsule further comprises a GPS logger configured to record a location of a termination of the second internal wall section, the second capsule configured to transmit the location of the termination of the second internal wall section to the third capsule, wherein the third capsule is configured to determine, as a function of the location, a discharge location of a third treatment fluid or substance of the third capsule, and discharge the third treatment fluid or substance at the discharge location.

6. The pipe treatment assembly of claim 1, further comprising a third capsule, wherein the second capsule comprises a fluid sensor configured to sense an absence of the second treatment fluid or substance within the second capsule and the controller is configured to determine, as a function of feedback from the fluid sensor, a time period that it took the second treatment fluid or substance to be fully discharged, and the third capsule is configured to treat, as a function of the time period, the pipe at a third internal wall section downstream of and adjacent the second internal wall section.

7. The pipe treatment assembly of claim 1, wherein the first and second treatment fluid or substance comprise at least one of a corrosion inhibitor, a chemical, or an additive.

8. The pipe treatment assembly of claim 1, wherein the pipe comprises a second pipe fluid immiscible with the pipe fluid, the second capsule further comprising a buoyancy ring configured to keep the second capsule floating on an interface of the pipe fluid and the second pipe fluid.

9. The pipe treatment assembly of claim 8, wherein the pipe fluid comprises water and the second pipe fluid comprise oil, the buoyancy ring comprising a material with a density that is lower than water but greater than oil to maintain the second capsule floating on the interface of the water and oil, with the second discharge port facing the water such that the second treatment fluid or substance discharges into the water.

10. The pipe treatment assembly of claim 1, wherein the second capsule further comprises a propeller odometer driven by a rotatable propeller configured to measure a travel distance of the second capsule as a function of rotations of the propeller.

11. The pipe treatment assembly of claim 10, wherein the rotatable propeller is arranged to disturb a flow of the pipe fluid to facilitate a dissolution or mixing of the second treatment fluid or substance in the pipe fluid as the second treatment fluid exits the second capsule.

* * * * *